United States Patent [19]  [11] Patent Number: 5,343,678
Stuart  [45] Date of Patent: Sep. 6, 1994

[54] LAWN MOWER CONTROL DEVICE

[75] Inventor: Thomas G. Stuart, Mukwonago, Wis.

[73] Assignee: Ransomes, Inc., Johnson Creek, Wis.

[21] Appl. No.: 17,210

[22] Filed: Feb. 4, 1993

[51] Int. Cl.⁵ .................... A01D 34/68; A01D 69/10
[52] U.S. Cl. ..................................... 56/11.3; 56/11.6; 180/19.3
[58] Field of Search ............... 56/10.8, 11.3, 11.6, 56/11.8; 180/19.1, 19.2, 19.3; 192/11

[56] References Cited

U.S. PATENT DOCUMENTS

| | | | |
|---|---|---|---|
| Re. 32,954 | 6/1989 | Lamusga | 56/202 |
| D. 305,198 | 12/1989 | White et al. | D8/8 |
| D. 320,731 | 10/1991 | Pink et al. | D8/107 |
| 2,329,372 | 9/1943 | Hitch | 56/11.4 X |
| 2,601,752 | 7/1952 | Rose . | |
| 2,771,959 | 11/1956 | Phelps . | |
| 3,224,196 | 12/1965 | Bennett | 180/6.48 |
| 3,550,708 | 12/1970 | Paramythioti | 180/6.48 |
| 3,564,186 | 2/1971 | Mittelstadt . | |
| 3,586,275 | 6/1971 | Mittelstadt | 248/52 |
| 3,616,869 | 11/1971 | Rilling | 180/6.48 |
| 3,649,997 | 3/1972 | Thorud | 16/111 A |
| 3,942,604 | 3/1976 | Black, III | 56/10.8 X |
| 4,043,416 | 8/1977 | Albright et al. | 180/6.48 |
| 4,202,422 | 5/1980 | McLean | 180/6.48 |
| 4,221,108 | 9/1980 | Owens | 56/11.3 |
| 4,293,041 | 10/1981 | Holmstadt et al. | 172/39 |
| 4,325,195 | 4/1982 | Comer | 37/227 |
| 4,326,370 | 4/1982 | Thorud | 56/202 |
| 4,335,566 | 6/1982 | Hurd | 56/11.8 |
| 4,391,041 | 7/1983 | Porter-Bennett | 172/41 X |
| 4,458,472 | 7/1984 | Christopherson | 56/10.5 |
| 4,493,180 | 1/1985 | Wick | 56/11.3 |
| 4,531,347 | 7/1985 | Schutz | 56/10.5 |
| 4,538,401 | 9/1985 | Takamizawa et al. | 56/11.8 |
| 4,558,558 | 12/1985 | Horner, Jr. et al. | 56/11.3 |
| 4,589,249 | 5/1986 | Walker et al. | 56/16.6 |
| 4,637,202 | 1/1987 | Lamusga | 56/16.6 |
| 4,667,459 | 5/1987 | Scanland et al. | 56/11.3 |
| 4,694,528 | 9/1987 | Comer et al. | 15/330 |
| 4,704,847 | 11/1987 | Greider et al. | 56/10.5 |
| 4,730,829 | 3/1988 | Carlson | 272/129 |
| 4,753,062 | 6/1988 | Roelle | 56/10.5 |
| 4,756,101 | 7/1988 | Friberg et al. | 56/17.2 X |
| 4,772,015 | 9/1988 | Carlson et al. | 272/116 |
| 4,781,665 | 11/1988 | Walker | 474/133 |
| 4,787,195 | 11/1988 | Wenzel | 56/11.1 |
| 4,815,765 | 3/1989 | Peterson | 280/775 |
| 4,829,675 | 5/1989 | Beihoffer | 30/276 |
| 4,835,949 | 6/1989 | Seyerle | 56/10.8 |
| 4,878,340 | 11/1989 | Roy et al. | 56/249 |
| 4,885,903 | 12/1989 | Scag | 56/10.8 |
| 4,920,733 | 5/1990 | Berrios | 56/10.9 |
| 4,920,734 | 5/1990 | Wenzl | 56/11.1 |
| 4,932,192 | 6/1990 | Ishimaru | 56/11.8 |
| 4,951,449 | 8/1990 | Thorud | 56/2 |
| 4,958,483 | 9/1990 | Heismann | 56/17.5 |
| 4,967,543 | 11/1990 | Scag et al. | 56/10.8 |
| 4,969,320 | 11/1990 | Langford | 56/16.6 |
| 4,991,382 | 2/1991 | Scag | 56/10.9 |
| 5,090,183 | 2/1992 | Thorud et al. | 56/2 |
| 5,101,745 | 4/1992 | Podevels et al. | 111/127 |
| 5,146,735 | 9/1992 | McDonner | 180/19.3 X |
| 5,155,985 | 10/1992 | Oshima et al. | 56/10.8 |

FOREIGN PATENT DOCUMENTS 2116663 9/1983 United Kingdom .
2154289 9/1985 United Kingdom .

OTHER PUBLICATIONS

Manual of Hayter Condor Mower (undated).
Manual of Gravely Pro Series 1986.

(List continued on next page.)

Primary Examiner—David J. Bagnell
Attorney, Agent, or Firm—Reinhart, Boerner, Van Deuren, Norris & Rieselbach

[57] ABSTRACT

A control apparatus for a lawn mower which includes two coupling members pivotable about a single axis. The coupling members are connected to a drive mechanism and a braking mechanism for the lawn mower. The members are coupled so that a forward pushing force applied by the operator actuates forward driving movement of the lawn mower and a pulling force actuates the braking mechanism when the drive mechanism is placed in a forward gear.

21 Claims, 4 Drawing Sheets

OTHER PUBLICATIONS

Manual of Walker Rider Lawnmowers, 1987.
Catalog of Toro Commercial Mid-Size Walk Power Mowers, 1985.
Ransomes Bob-Cat Technical Mower Manual, 1987.
Jacobsen Commercial 32 36 50 Rotary Mowers Manual, 1984.
Yazoo Master Mower Literature (undated).
Giant Mow Literature by Giant-Vac (undated).
Tuchcut Mower Literature (undated).
Catalog of Bunton Commercial Lawn-Turf Equipment, 1979.
Catalog of The Cargo-Trac Self-Propelled, Walk--Behind Flail, C-G Industries (undated).
Toro Catalog of Mid-Size Commercial Walk Mowers (undated).
Ransomes Wayfarer List of Parts, Publication No. 23589H (undated).
Ransomes Wayfarer Operators Instructions, Publication No. 23564H (undated).
Ransomes Range of Sweepers Catalog, Publication No. 23637H (undated).
Ransomes Wayfarer Reelcutter & Rotacutter, Publication No. 23573H (undated).

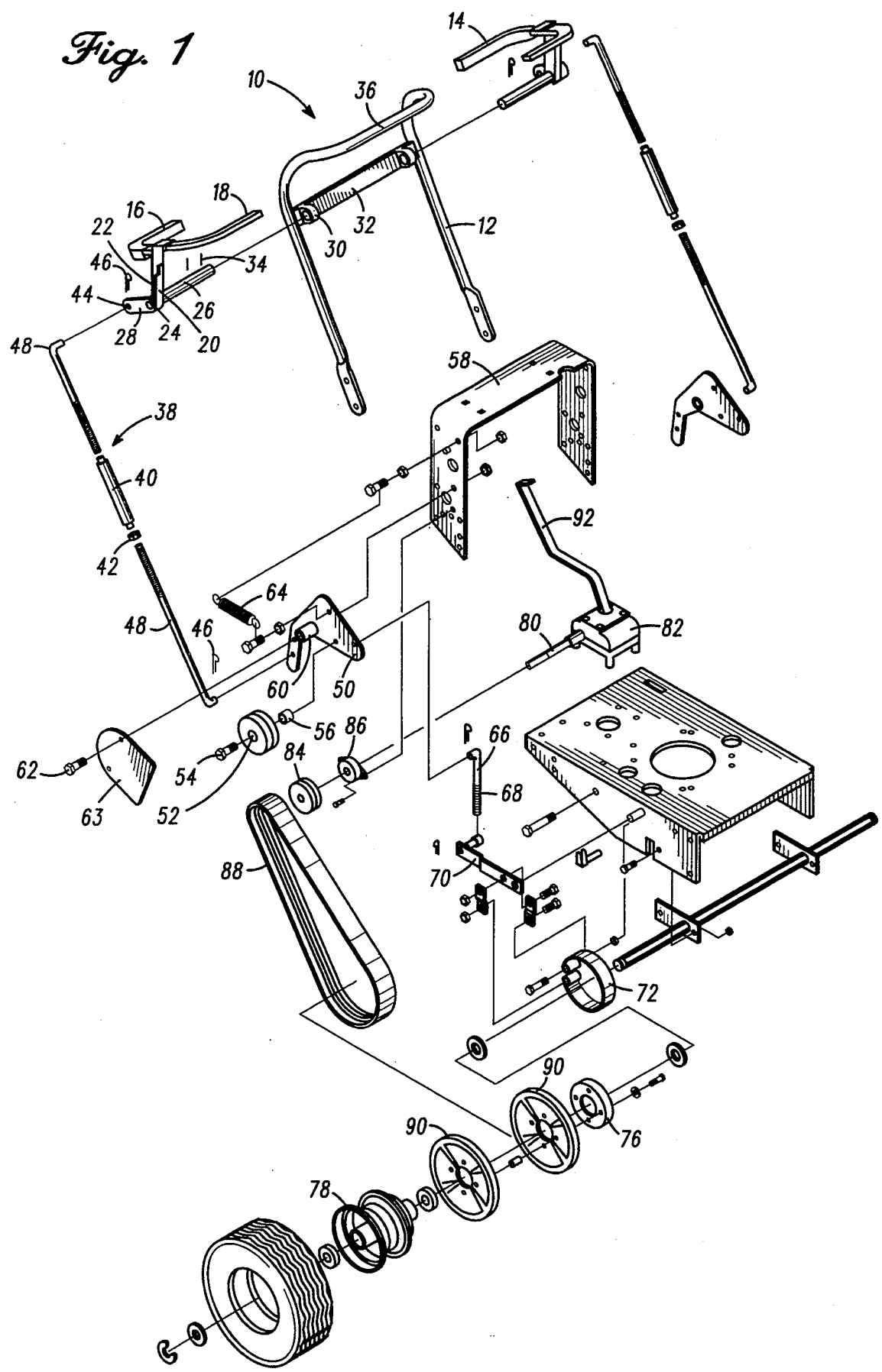

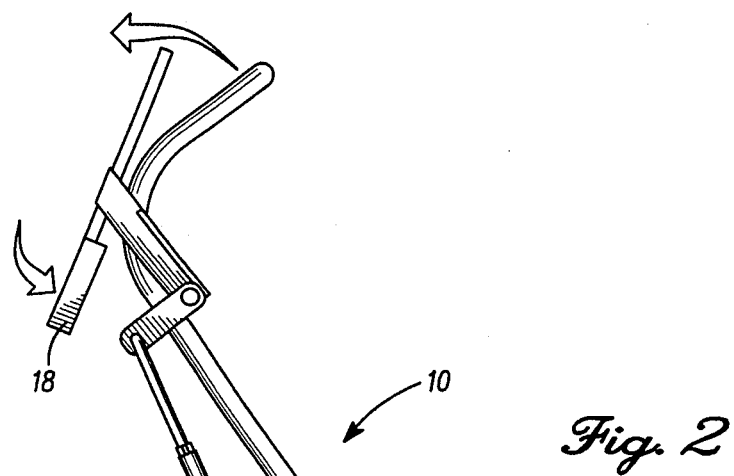
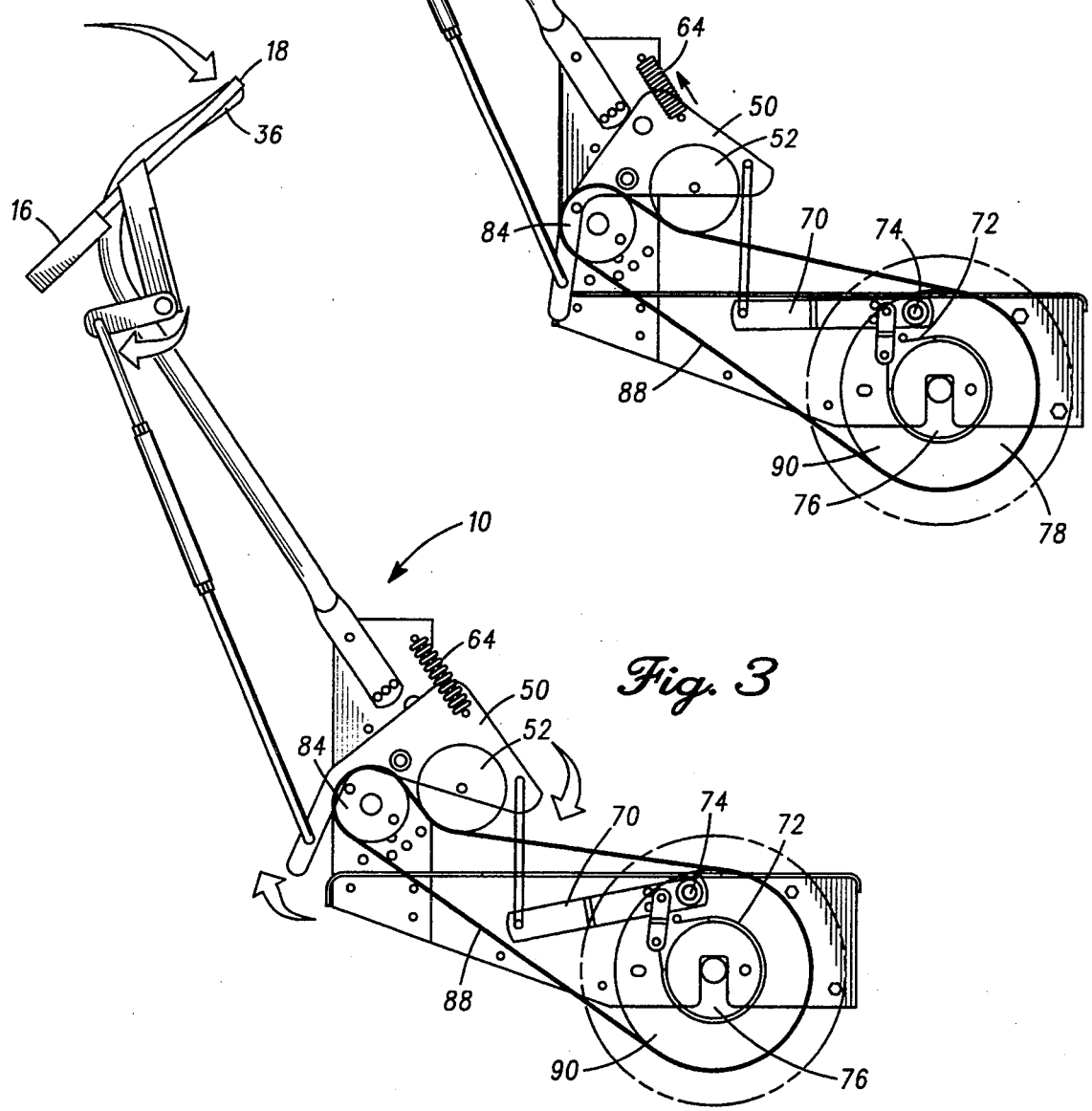

LAWN MOWER CONTROL DEVICE

The present invention relates generally to an apparatus and method for controlling a lawn mower. More particularly, the invention relates to a novel apparatus and method for controlling a lawn mower whereby forces applied by the operator are translated into powered mower motion in substantially the same direction as the operator-applied forces.

A multitude of devices for controlling self-propelled lawn mowers are disclosed in the prior art. Many of these devices do not provide a "deadman" control whereby release of the control causes stoppage of drive wheels. Those prior art designs incorporating "deadman" control are typically complex and therefore require more frequent and expensive maintenance.

Additionally, to induce powered mower movement in a desired direction, many prior art devices require the operator to apply forces in a direction opposite the desired direction. This is counterintuitive and can cause operator injury when the mower does not function as the operator expects.

Further, many conventional drive mechanisms require engaging a drive belt with an idler pulley to increase the drive belt tension and to produce driving forces. Producing this tension requires relatively large forces and such conventional devices can quickly fatigue the operator. For example, many prior art designs utilize hand grip devices which must be continually squeezed by the operator to produce the required belt tension for drive means actuation. Alternatively, some prior devices utilize locking mechanisms for retaining the tension on the belt, but do not provide the important deadman control for safety purposes. Additionally, many of these prior devices do not allow one-handed operation of the mower so that the operator may push aside obstructions such as tree branches and the like while mowing.

It is therefore an object of the invention to provide an improved control device and method of operation for a lawn mower.

It is another object of the invention to provide a novel lawn mower control device which complies with current and proposed ANSI safety standards.

It is a further object of the invention to provide a novel method and apparatus for controlling a self-propelled lawn mower which engages a braking mechanism when external forces are removed from the device.

It is still another object of the invention to provide an improved lawn mower control device which is relatively simple in construction and rugged in design.

It is yet a further object of the invention to provide an improved apparatus and method for controlling a self-propelled lawn mower whereby forces applied by the operator induce powered lawn mower movement in substantially the same direction as the operator-applied forces.

It is an additional object of the invention to provide a novel lawn mower control device which includes a component for quickly adjusting a drive actuation feature.

It is still a further object of the invention to provide an improved lawn aerator control device which complies with ANSI safety standards.

It is still a further object of the invention to provide an improved lawn mower control device which minimizes operator fatigue while providing a "deadman" safety feature.

It is yet another object of the invention to provide an improved lawn mower control device which enables the operator to control driving and braking forces of a lawn mower with one hand.

It is yet an additional object of the invention to provide an improved lawn mower control device which pivots about only a single axis, thereby increasing the simplicity and reliability of the device.

Other advantages and features of the invention, together with the organization and manner of operation thereof, will become apparent from the following detailed description when taken in conjunction with the accompanying drawings, wherein like elements have like numerals throughout the drawings.

BRIEF DESCRIPTION OF THE DRAWINGS

FIG. 1 shows an exploded perspective view of a lawn mower control device constructed in accordance with one form of the invention;

FIG. 2 illustrates a front elevational view of a lawn mower control device constructed in accordance with one form of the invention depicted in a braking configuration;

FIG. 3 shows a front elevational view of a lawn mower control device depicted in a forward drive configuration;

DETAILED DESCRIPTION OF PREFERRED EMBODIMENTS

Figure 4:
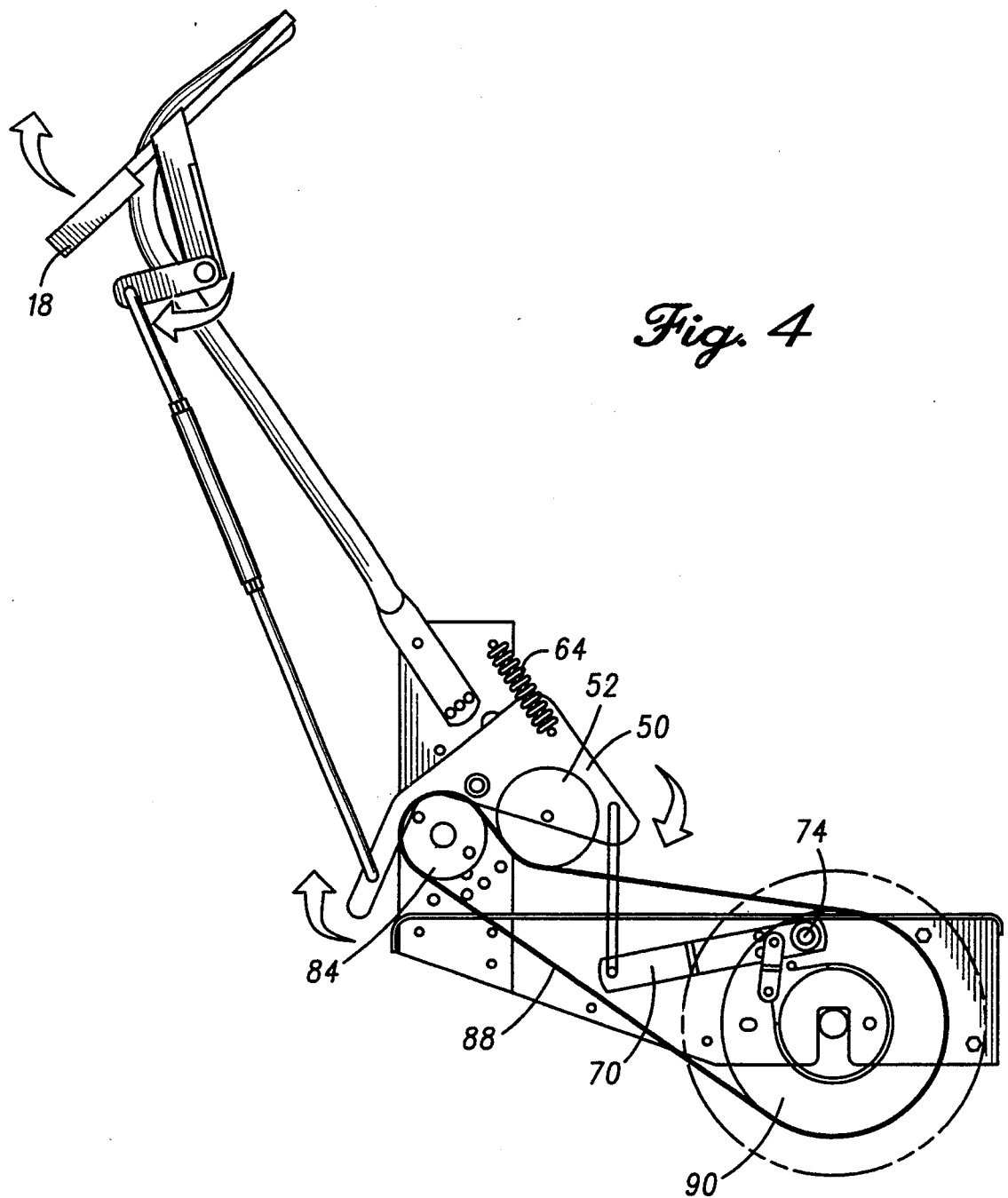
FIG. 4 illustrates a front elevational view of a lawn mower control device depicted in a reverse drive configuration.

Referring now to the figures and more particularly to FIG. 1, a lawn mower control device constructed in accordance with one form of the invention is indicated generally at 10. A handle 12 supports both a pivotable left control assembly 14 and a pivotable right control assembly 16 between the ends of the assemblies. In the most preferred form of the invention, the assemblies 14, 16 are supported by the handle substantially at or near the centers of the assemblies 14 and 16. The left control assembly 14 and the right control assembly 16 are mirror images of each other and are independently operable from each other. Accordingly, the details of the right control assembly 16 which are discussed herein herein also apply to the left control assembly 14 which operates in a substantially identical fashion to the right control assembly 16 in this embodiment.

As shown in FIG. 1, the right control assembly 16 preferably comprises a substantially C-shaped member 18 connected to a member support 20 at a member support tapper end 22 by welding or other conventional techniques. While a substantially C-shaped member is described for nonlimiting illustrative purposes, other shapes such as elongate members, rectangles, polygons, and ellipses can be used equivalently. A member support lower end 24 is connected to a pivot rod 26 and a lever 28. The pivot rod 26 is inserted into a collar 30 located on a bar 32 on the handle 12 for pivotal engagement therewith. The pivot rod 26 is retained in pivoting engagement with the collar 30 through the use of cotter pins 34 which are inserted into holes drilled through the pivot rod 26.

The substantially C-shaped member 18 is shaped to generally conform to the shape of upper portion 36 of the handle. This enables the operator to comfortably and easily retain the substantially C-shaped member 18 in a position adjacent to handle 12. Clockwise pivoting movement of the right control assembly 16 (as viewed in FIG. 3) is limited by the upper portion 36 of the handle 12.

Preferably, the lever 28 is connected to an adjustable rod 38 as shown in FIG. 1, though a nonadjustable rod or other conventional linkage means can be used satisfactorily. The length of the adjustable rod 38 can be adjusted by a conventional turnbuckle mechanism 40 with a locking nut 42 as shown in FIGS. 1 and 2. The adjustable rod 38 is pivotally engaged with a lever hole 44 disposed in the lever 28. A conventional pin 46 retains the adjustable rod 38 in pivotal engagement and also enables quick and simple length change of the adjustable rod 38.

Changing the length of the adjustable rod 38 is accomplished by 1) removing one of the conventional pins 46 to free one of ends 48 of the adjustable rod 38; 2) loosening the locking nut 42 from binding engagement with the turnbuckle mechanism 40; 3) rotating the end of the adjustable rod 38 about the longitudinal axis of the turnbuckle mechanism 40 to achieve the desired length; 4) tightening the locking nut 42 until it engages the turnbuckle mechanism 40, thereby preventing further adjustable rod 38 rotation about the longitudinal axis of the turnbuckle mechanism; and 5) reinserting the end 48 of the adjustable rod 38 into its corresponding hole, and pinning the end 48 in place with the conventional pin 46.

The lower of the ends 48 of the adjustable rod 38 is pivotally connected to a bell crank 50 by its insertion into a hole in the lower portion of the bell crank 50. The lower adjustable rod end 48 is retained in pivotal engagement with the bell crank 50 by the conventional pin 46.

An idler pulley 52 is mounted to the bell crank 50 by an idler bolt 54. The idler bolt 54 is inserted through an idler bearing 56 about which the idler pulley 52 rotates. The idler pulley 52 moves with the bell crank 50 as the bell crank 50 pivots in response to movement of the adjustable rod 38.

The bell crank 50 is pivotally connected to a housing 58 by inserting a bolt 62 through a bushing 60 connected to the bell crank 50. The bolt 62 is first inserted through a safety guard 63 which helps prevent entanglement in a drive belt 88. The bell crank 50 is biased in a counterclockwise direction (as viewed in FIG. 2) by a spring 64 which is attached to both the bell crank 50 and the housing 58. The spring 64 exerts spring force SF as shown in FIG. 2. A brake rod 66 is inserted into and pinned to a front portion of the bell crank 50 for pivotal engagement therewith. The lower brake rod portion 68 is connected to a brake arm 70 which can engage a brake band 72 as shown in FIGS. 1, 2 and 3.

As the brake rod 66 is moved upward by counterclockwise rotation of the bell crank 50, the brake arm 70 rotates about a brake arm pivot 74 as shown in FIGS. 2 and 3. This rotation causes the diameter of the brake band 72 to decrease until the brake band 72 engages a brake drum 76 disposed generally within the interior of the brake band 72. The brake band 72 comprises conventional material with a relatively high coefficient of friction so that the contact between the brake band 72 and brake drum 76 produces high frictional losses. This frictional engagement resists rotation of the brake drum 76, thereby resisting rotation of a drive wheel 78 connected to the brake drum 76.

As shown in FIG. 1, a drive shaft 80 (which can be connected to a transmission, a hydrostatic motor or other conventional drive mechanism 82) is connected to a drive pulley 84. The drive shaft 80 is preferably inserted through a drive bearing 86 located between the drive pulley 84 and the drive mechanism 82. This arrangement helps to reduce stresses on the drive shaft 80 and drive mechanism 82. The drive pulley 84 engages a drive belt 88 which in turn engages a drive wheel pulley 90. The drive wheel pulley 90 is attached to the drive wheel 78 for rotation therewith.

As shown in FIGS. 1 and 2, in a condition when no external forces are applied to the lawn mower control device 10, the spring force SF from the spring acting on the bell crank 50 relaxes the tension on the drive belt 88. Accordingly, the drive belt 88 is free to slip on the drive pulley 84 and drive wheel pulley 90, thereby providing a neutral configuration. Simultaneously, the spring force SF causes the brake arm 70 to engage the brake band 72 with the brake drum 76, thereby preventing movement of the lawn mower. The braking force can be increased by pivoting the substantially C-shaped member 18 in a counterclockwise direction as viewed in FIG. 2. This pivoting is typically induced by the operator pulling on the upper portion of the substantially C-shaped member 18, and this motion is an intuitive reaction when the operator wants to hold the lawn mower in place. The pivoting action adds additional force to the spring force SF produced by the spring 64 thereby further relaxing tension on the drive belt 88 and further tightening the brake band 72 on the brake drum 76.

As shown in FIGS 1 and 3, when a gear box selector 92 places the drive mechanism 82 in a forward gear, pushing the upper portion of the substantially C-shaped member 18 toward the handlebar causes the idler pulley 52 to engage the drive belt 88 and increase the tension thereof. This engagement (which is adjustable by changing the length of the adjustable rod 38) gradually ceases the slippage between the drive belt 88, the drive pulley 84 and the drive wheel pulley 90. Simultaneously, the brake arm 70 is moved to relax the brake band tension, thereby allowing forward movement in response to the driving force resulting from engagement with the drive belt 88 of the drive pulley 84 and drive wheel pulley 90. Once again, this feature comports well with ergonomic engineering principles by actuating forward drive wheel movement in response to a forward pushing force from the operator.

Further, when the operator applies a pushing force to only the right control assembly 16, driving forces are actuated only on the right side of the mower. This causes the mower to turn left if the left control assembly 14 is untouched or pulled back. Accordingly, this embodiment of the invention provides intuitive and predictable control of the lawn mower.

As shown in FIGS. 1 and 4, when the gear box selector 92 places the drive mechanism 82 in a reverse gear, pulling up on the lower portion of the substantially C-shaped member 18 induces the same mechanical action as described for the forward drive activation. Because the drive pulley 84 is now rotating in the opposite direction due to the position of the gear box selector 92, rotation of the drive wheel 78 causes the lawn mower to back up in response to the pulling force applied by the operator. In this way, motions which are intuitive to the operator actuate the corresponding movement of the lawn mower. Additionally, if the lawn mower begins to overtake the operator, the operator can stop pulling on the substantially C-shaped member 18. This disengages drive belt 88 and engages brake band 72 on brake drum 76. If a pushing force is applied to the lower portion of the substantially C-shaped member 18 by the operator or a portion of the operator's body, the counterclockwise pivoting of the substantially C-shaped member 18 causes greater braking force to be generated. Therefore, the mower brakes are applied upon contact with the operator's body, thereby preventing the mower from overtaking and injuring the operator.

Figure 5:
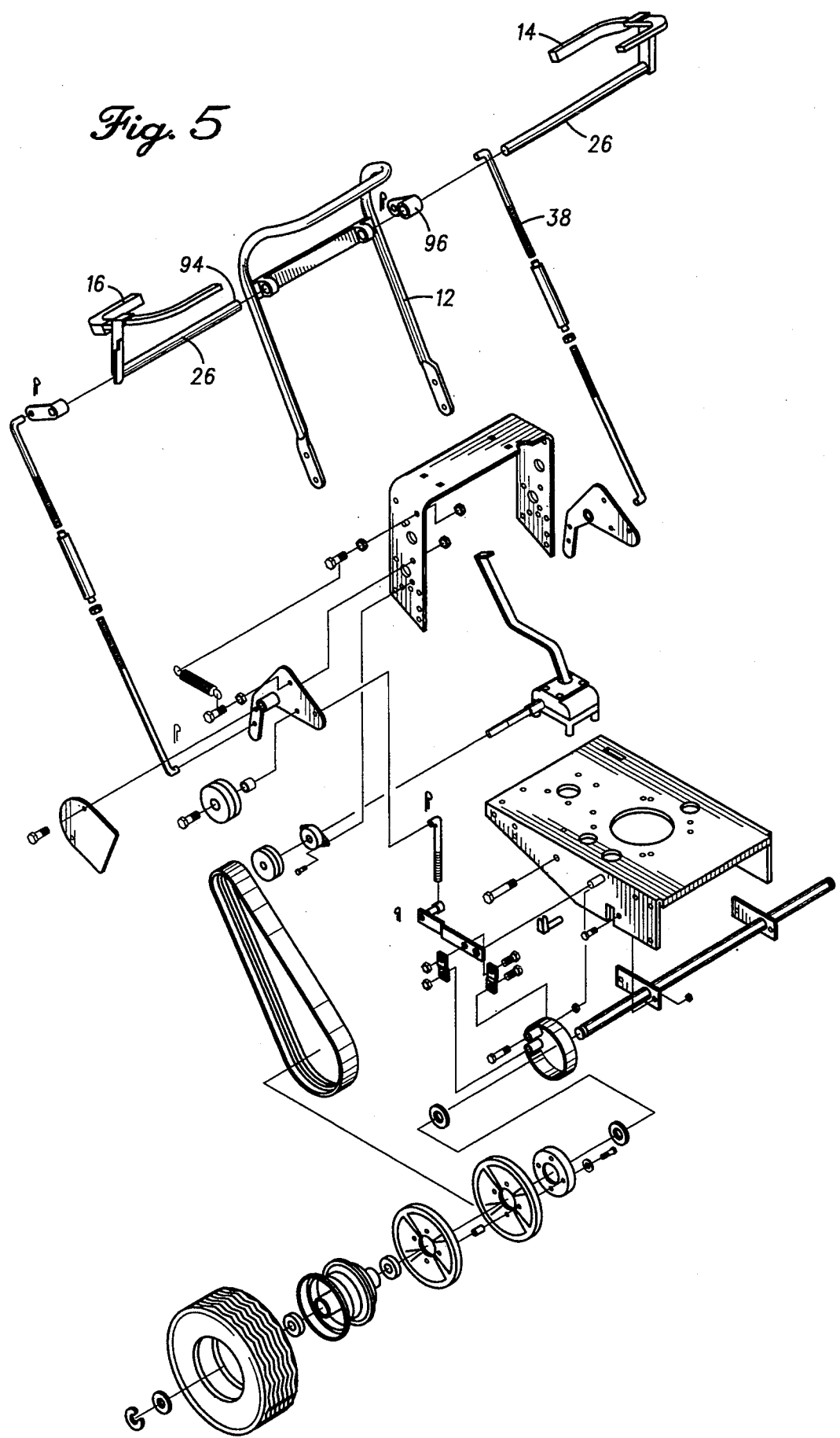
FIG. 5 shows an exploded perspective view of an alternative embodiment of a lawn mower control device of the invention.

An alternative embodiment of a lawn mower control device 10 constructed in accordance with another form of the invention is shown in FIG. 5. In this embodiment, the pivot rods 26 are sized so as to rotate within one another. The right pivot rod 94 is connected to the left lever 96 in order to induce driving and braking forces on the left side of the lawn mower. Conversely, the left control assembly 14 controls the driving and braking of the right portion of the lawn mower. Accordingly, rotating the upper portion of the right control assembly 16 toward the handle 12 induces driving forces on the left side of the mower. This causes the mower to turn right if the left control assembly 14 is untouched or is pulled back.

Accordingly, the preferred embodiments described herein provide improved lawn mower control devices that comply with ANSI safety standards while minimizing operator fatigue. Further, these embodiments provide intuitive mower response when actuated which lessens the likelihood of operator mistake and injury. In addition, these devices are relatively simple and rugged, thus providing excellent performance while minimizing maintenance costs and effort.

While preferred embodiments have been illustrated and described, it should be understood that changes and modifications can be made therein without departing from the invention in its broader aspects. Various features of the invention are defined in the following claims.

What is claimed is:

1. A lawn mower having an engine mounted on a main housing, cutting means contained in a cutter housing attached to the main housing and driven by the engine, and wheels attached to the main housing and driven by driving means, the improvement comprising:
   at least two coupling members pivotable about only a single axis;
   each of said coupling members being coupled to and capable of independently actuating the driving means;
   means for returning the driving means to a neutral configuration when external forces are absent; and
   the driving means being actuated to drive at least one side of the mower in substantially the same direction as a force applied to pivot one of said coupling members.

2. A control apparatus for a lawn mower, comprising:
   at least two coupling members pivotable about only a single axis;
   each of such said coupling members being coupled to and capable of actuating a drive means for said lawn mower and capable of operating independently from one another;
   means for returning said drive means to a neutral configuration when external forces are absent; and
   said drive means being actuated to drive at least one side of said mower in substantially the same direction as a force applied to pivot one of said coupling members.

3. The device of claim 2 wherein said coupling members are oriented substantially vertically when said drive means is in the neutral configuration.

4. The device of claim 2 wherein said coupling members are limited in their pivotal movement in at least one direction by a lawn mower handle.

5. A control apparatus for a lawn mower, comprising:
   at least two substantially elongate members pivotable between their ends about only a single axis;
   each of said substantially elongate members being substantially coupled to and capable of actuating a drive means for a lawn mower and capable of being independently operable from one another;
   means for returning said drive means to a neutral configuration when external forces are absent; and
   said drive means being actuated to drive at least one side of said mower in substantially the same direction as a force applied to pivot one of said substantially elongate members.

6. The device of claim 5 wherein said substantially elongate members are oriented substantially vertically when said drive means is in the neutral configuration.

7. The device of claim 5 wherein said substantially elongate members limited in their pivotal movement in at least one direction by a lawn mower handle.

8. A control apparatus for a lawn mower, comprising:
   at least two substantially elongate members pivotable between their ends about a horizontal axis;
   each of said substantially elongate members being substantially coupled to and capable of actuating a drive means for a lawn mower and capable of being independently operable from one another;
   means for returning said drive means to a neutral configuration when external forces are absent; and
   said drive means being actuated to drive at least one side of said mower in substantially the same direction as a force applied to pivot one of said substantially elongate members.

9. The device of claim 8 wherein said substantially elongate members are oriented substantially vertically when said drive means is in the neutral configuration.

10. The device of claim 8 wherein said substantially elongate members are pivotable only about a horizontal axis.

11. The device of claim 8 wherein said substantially elongate members are limited in their pivotal movement in at least one direction by a lawn mover handle.

12. A control apparatus for a lawn mower, comprising:
   at least two pivotable substantially polygonal-shaped members coupled substantially near their centers to a lawn mower handle;
   each of said substantially polygonal-shaped members being coupled to and capable of actuating a drive means for driving a lawn mower capable of being independently operable from one another; and
   said drive means being actuated to drive at least one side of a mower in substantially the same direction as a force applied to pivot one of said substantially polygonal-shaped members.

13. The device of claim 12 wherein said substantially C-shaped members are capable of engaging a means for braking said lawn mower.

14. The device of claim 12 further including means for returning said drive means to a neutral configuration when external forces are absent.

15. The device of claim 12 wherein said substantially polygonal-shaped members are oriented substantially vertically when said drive means is in a neutral configuration.

16. The device of claim 12 wherein said substantially polygonal-shaped members are limited in their pivotal movement in at least one direction by said lawn mower handle.

17. A control apparatus for a lawn mower, comprising:

at least two pivotable substantially C-shaped members coupled substantially near their centers to a lawn mower handle;

each of said substantially C-shaped members being substantially coupled to and capable of actuating a drive means for driving said lawn mower and capable of being independently operable from each other; and said drive means being actuated to drive at least one side of said mower in substantially the same direction as a force applied to pivot one of said substantially C-shaped members.

18. The device of claim 17 wherein said substantially C-shaped members are capable of engaging means for braking said lawn mower.

19. The device of claim 17 further including means for returning said drive means to a neutral configuration when external forces are absent.

20. The device of claim 17 wherein said substantially C-shaped members are oriented substantially vertically when said drive means is in a neutral configuration.

21. The device of claim 17 wherein said substantially C-shaped members are limited in their pivotal movement in at least one direction by said lawn mower handle.

* * * * *